United States Patent Office 2,799,815
Patented July 16, 1957

2,799,815

DRY PLATE RECTIFIERS

Leslie Joseph Lockett, King's Cross, London, England, assignor to Westinghouse Brake & Signal Company Limited, London, England Application January 11, 1955, Serial No. 431,171

Claims priority, application Great Britain January 13, 1954

9 Claims. (Cl. 317—234)

This invention relates to metal rectifier assemblies of the type in which the rectifier elements are enclosed within a metal case the cooling of which is assisted by mounting it upon a metal frame such as a chassis or the like in such a manner that heat generated by the rectifier is dissipated by conduction from the box to the metal frame.

The invention has for its object the provision of a rectifier assembly of the type described which is suitable for providing a low power H. T. supply such as is required, for instance, by television converters.

According to the invention a metal rectifier assembly comprises, in combination, a rectangular metal case provided with a lug or lugs by means of which the case may be fixed to a metal frame such as a chassis or the like and enclosing stacks of rectifier elements arranged side by side, one or more resilient members and one or more contact members, the stacks being separated from the case by sheet insulating material and being electrically interconnected by means of a connecting strip, the contact member or members making connection either directly or indirectly with the end of each stack remote from the strip of conducting material and being maintained in good electrical connection therewith by compression of the resilient member or members.

Preferably two lugs are provided and arranged to extend from opposite sides of the case. Preferably also the metal case is formed from one sheet by folding.

The insulating material may be folded to form a liner for the case, the stacks being separated by means of a second sheet of insulating material which preferably forms an extension of the contact member. Alternatively, the insulating material may be formed in one sheet which is folded to form a separate compartment for each stack. The insulating material is preferably of a kind which possesses a relatively high thermal conductivity and is as thin as is possible consistent with the provision of adequate electrical insulation, in order to facilitate the transfer of heat from the rectifier elements to the case.

The connecting strip may be insulated from the case and the stacks may then be connected in series: alternatively, the connecting strip may make contact with the case and the stacks be connected in parallel.

Where two stacks are provided they may be positioned between the limbs of an E-shaped frame of rigid insulating material. When such a frame is used it may be arranged to fit a metal case of U-shaped section so as to form, with the case, a complete enclosure for the stacks.

The invention will now be described with reference to the accompanying drawings of which, Figures 1 and 2 show isometric views of two forms of assembly in accordance with the invention;

Figure 1:
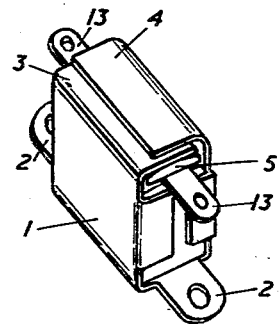
Figure 2:
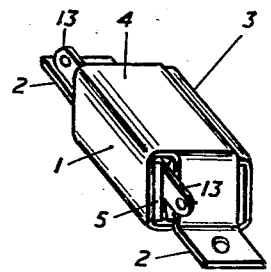

As shown in Figures 1 and 2, the metal case 1, formed of 20 gauge aluminium, is folded to form a rectangular box having two lugs 2 for attaching the case to a chassis (not shown), the box being closed by means of two flaps 3 and 4 which are folded one against the other in such a manner as to cause a compressive force to be exerted upon a thin sheet of rubber 5 and the enclosed rectifier elements (not shown).

Figure 3:
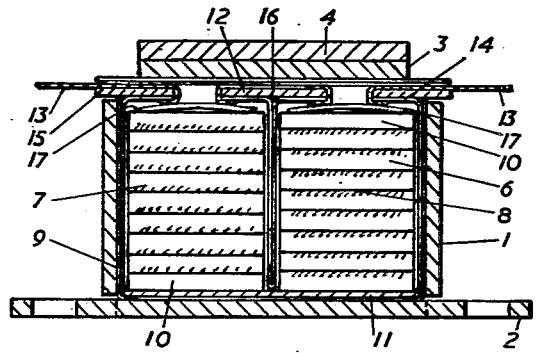
Figure 3 shows a vertical section through a modified form of the arrangement shown in Figure 1.

In Figure 3 the rectifier elements 6 are shown arranged in two stacks 7 and 8 placed side by side, the stacks being insulated from the case 1 by a thin liner 9. This liner is of sheet insulating material 0.005 inch thick, which is sold under the registered trademark "Leatheroid." Each stack includes one spacer 10 which makes contact with one electrode of one end element. The two stacks are interconnected at one end by means of a thin strip of aluminium 11 which is insulated from the case and which serves to connect the sixteen elements in series. External connection is made by means of a contact member 12, comprising two eyelet tags 13 which are riveted to a thin strip of "Leatheroid" 14 and a thick strip of the same material 15. The thin strip extends from one end to the other of the case along the outer side of each stack and is folded to form an extension 16 between the stacks. These extensions serve to separate the stacks and to anchor the contact member within the assembly. The thick strip 15 provides sufficient mechanical strength to prevent the thin sheet 14 being torn. Electrical contact between the tags 13 and the stacks 7 and 8 is maintained by pressure exerted by Phosphor bronze springs 17 placed between the tags and the adjacent ends of the stacks.

Figure 4:
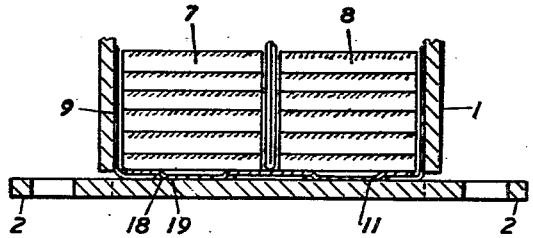
Figure 4 shows a portion of a vertical section through a modified form of the arrangement shown in Figure 3.

In the arrangement shown in Figure 4 the stacks 7 and 8 are connected in parallel, the liner 9 having holes 18 formed in it through which project corresponding dimples 19 formed on the connecting strip 11, the adjacent ends of each stack being thereby connected to the metal case 1.

Figure 5:
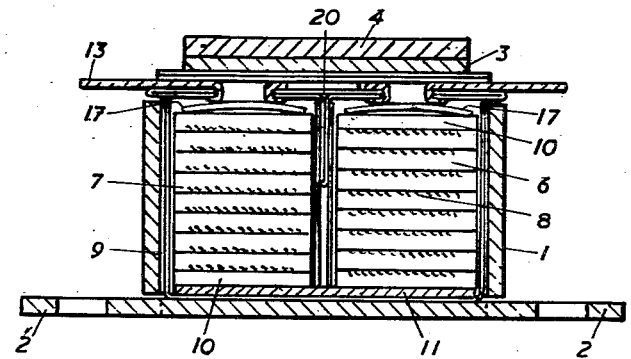
Figures 5 and 6 show respectively vertical and horizontal sections through another modified form of the arrangement shown in Figure 3.
Figure 6:
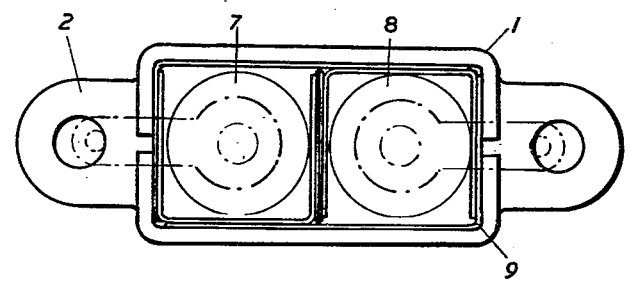

In the arrangement shown in Figures 5 and 6 the liner 9 is folded to form two compartments, one for each stack. With such an arrangement the contact member may be anchored by means of an extension 20 of this insulating material which extends only a short distance along the stacks.

Figure 8:
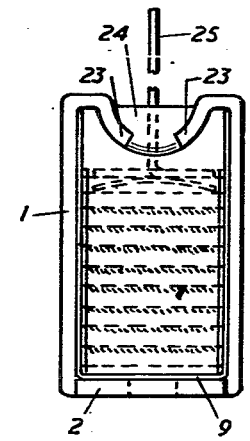
Figures 7 and 8 show respectively a vertical section through, and an end elevation of, an alternative embodiment.
Figure 7:
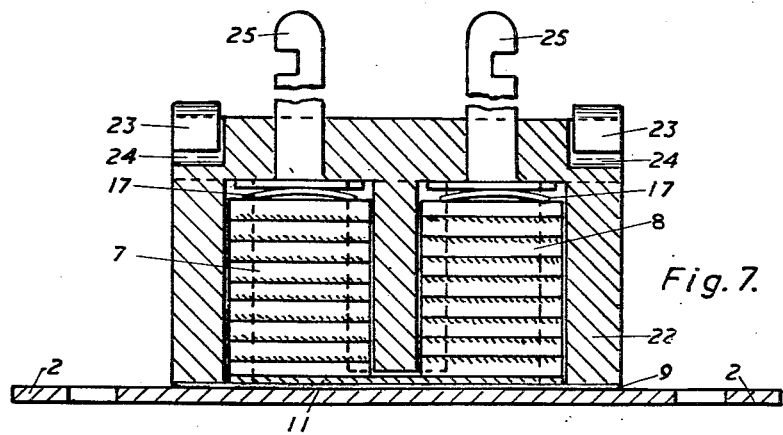

In the arrangement shown in Figures 7 and 8 the stacks are positioned between the limbs of an E-shaped frame of ebonite 22, the limbs having hollow surfaces which closely surround the cylindrical stacks. The ebonite frame is enclosed within a U-shaped case of sheet aluminium provided with lugs 2 by means of which the case is attached to a chassis. The case is also provided with lugs 23 which are folded into recesses 24 in the ebonite frame, thereby attaching the case firmly to the frame. Efficient cooling is obtained with this arrangement by making the thickness of the frame slightly smaller than the diameter of the stacks, thereby ensuring that the stacks project slightly from the sides of the frame and are thus maintained in firm contact with a thin U-shaped liner 9 which fits with the case. The stacks are interconnected by means of a thin strip of aluminium 11 and contact is made to the upper ends of the stacks by means of tags 25. The stacks are maintained under pressure by means of the Phosphor bronze springs 17.

Having thus described my invention what I claim is:

1. A metal rectifier assembly comprising, in combination, a rectangular metal case provided with lugs by means of which said case may be fixed to a metal frame such as a chassis and enclosing two stacks of rectifier elements arranged side by side, a resilient member, a contact member, a sheet of insulating material separating said stacks from said case, a connecting strip electrically interconnecting said stacks and being separated from said case by said sheet insulating material, said contact member making connection with an end of each stack remote from said connecting strip and being maintained in good electrical connection therewith by compression of said resilient member.

2. A metal rectifier assembly comprising, in combination a rectangular metal case provided with lugs by means of which said case may be fixed to a metal frame such as a chassis and enclosing two stacks of rectifier elements arranged side by side, a contact member, a sheet of insulating material separating said stacks from said case, a connecting strip electrically interconnecting said stacks, said connecting strip being separated from said case by said sheet, an electrically conducting resilient member associated with each stack and making contact with said stack at the end thereof remote from said connecting strip, said contact member making connection with each resilient member and being maintained in good electrical connection therewith by compression of said resilient members.

3. A metal rectifier assembly comprising, in combination, a rectangular metal case provided with lugs by means of which said case may be fixed to a metal frame such as a chassis and enclosing two stacks of rectifier elements arranged side by side, a resilient member, a contact member, a sheet of insulating material separating said stacks from said case, a connecting strip electrically interconnecting said stacks and making contact with said case, said contact member making connection with an end of each stack remote from said connecting strip and being maintained in good electrical connection therewith by compression of said resilient member.

4. A metal rectifier assembly comprising, in combination, a rectangular metal case provided with lugs by means of which said case may be fixed to a metal frame such as a chassis and enclosing two stacks of rectifier elements arranged side by side, a contact member, a sheet of insulating material separating said stacks from said case, a connecting strip electrically interconnecting said stacks and making contact with said case, an electrically conducting resilient member associated with each stack and making contact with said stack at an end thereof remote from said connecting strip, said contact member making connection with each resilient member and being maintained in good electrical connection therewith by compression of said resilient members.

5. A metal rectifier assembly comprising, in combination, a rectangular metal case provided with lugs by means of which said case may be fixed to a metal frame such as a chassis and enclosing two stacks of rectifier elements arranged side by side, a resilient member, a contact member, having an extension formed of insulating material extending between the stacks and thereby separating said stacks from each other, a sheet of insulating material separating said stacks from said case, a connecting strip electrically interconnecting said stacks, said connecting strip being separated from said case by said sheet insulating material, said contact member making connection with an end of each stack remote from said connecting strip and being maintained in good electrical connection therewith by compression of said resilient member.

6. A metal rectifier assembly comprising, in combination, a rectangular metal case provided with lugs by means of which said case may be fixed to a metal frame such as a chassis and enclosing two stacks of rectifier elements arranged side by side, a contact member, having an extension formed of insulating material extending between the stacks and thereby separating the said stacks from each other, a sheet of insulating material separating said stacks from said case, a connecting strip electrically interconnecting said stacks, said connecting strip being separated from said case by said sheet, an electrically conducting resilient member associated with each stack and making contact with said stack at the end thereof remote from said connecting strip, said contact member making connection with each resilient member and being maintained in good electrical connection therewith by compression of said resilient members.

7. A metal rectifier assembly comprising, in combination, a rectangular metal case provided with lugs by means of which said case may be fixed to a metal frame such as a chassis and enclosing two stacks of rectifier elements arranged side by side, a resilient member, a contact member, having an extension formed of insulating material extending between the stacks and thereby separating said stacks from each other, a sheet of insulating material separating said stacks from said case, a connecting strip electrically interconnecting said stacks and making contact with said cases said contact member making connection with an end of each stack remote from said connecting strip and being maintained in good electrical connection therewith by compression of said resilient member.

8. A metal rectifier assembly comprising, in combination, a rectangular metal case provided with lugs by means of which said case may be fixed to a metal frame such as a chassis and enclosing two stacks of rectifier elements arranged side by side, a contact member, having an extension formed of insulating material extending between the stacks and thereby separating said stacks from each other, a sheet of insulating material separating said stacks from said case, a connecting strip electrically interconnecting said stacks and making contact with said case, an electrically conducting resilient member associated with each stack and making contact with said stack at an end thereof remote from said connecting strip, said contact member making connection with each resilient member and being maintained in good electrical connection therewith by compression of said resilient members.

9. A metal rectifier assembly comprising, in combination, a rectangular metal case of U-shaped section and provided with lugs by means of which said case may be fixed to a metal frame such as a chassis and fitting over an E-shaped frame of insulating material between each pair of parallel limbs of which is positioned a stack of rectifier elements, said case and frame together forming a complete enclosure for said stacks, a contact member associated with each stack, a sheet of insulating material separating said stacks from said case, a connecting strip electrically interconnecting said stacks, an electrically conducting resilient member associated with each stack and making contact with said stack at an end thereof remote from said connecting strip, said contact member making connection with each resilient member and being maintained in good electrical connection therewith by compression of said resilient members.

References Cited in the file of this patent

FOREIGN PATENTS 587,201     Great Britain _____ Apr. 17, 1947